United States Patent [19]
Ogawa

[11] Patent Number: 5,604,553
[45] Date of Patent: Feb. 18, 1997

[54] DATA RECORDING APPARATUS

[75] Inventor: Hidehiro Ogawa, Funabashi, Japan

[73] Assignee: Nikon Corporation, Tokyo, Japan

[21] Appl. No.: 354,081

[22] Filed: Dec. 6, 1994

[30] Foreign Application Priority Data

Dec. 10, 1993 [JP] Japan ................... 5-310737

[51] Int. Cl.⁶ .................................. G03B 17/24
[52] U.S. Cl. ............................................ 354/106
[58] Field of Search ..................... 354/105, 106

[56] References Cited

U.S. PATENT DOCUMENTS

| 4,814,802 | 3/1989 | Ogawa . | |
|---|---|---|---|
| 5,155,513 | 10/1992 | Matsumura et al. . | |
| 5,187,518 | 2/1993 | Kitagawa | 355/40 |
| 5,229,810 | 7/1993 | Cloutier et al. . | |
| 5,300,978 | 4/1994 | Miyasaka | 355/412 |
| 5,319,402 | 6/1994 | Tsujimoto et al. | 354/106 |
| 5,344,730 | 9/1994 | Kitamoto | 430/14 |
| 5,453,805 | 9/1995 | Itho | 354/106 |

FOREIGN PATENT DOCUMENTS

63-141034  6/1988  Japan .
2-293723  12/1990  Japan .

Primary Examiner—Safet Metjahic
Assistant Examiner—Daniel Chapik
Attorney, Agent, or Firm—Oliff & Berridge

[57] ABSTRACT

A data recording apparatus provided with a setting device that separately sets first data item that is related to the photographic image recording medium and second data item that is related to photographic images of a plurality of frames to be recorded on the photographic image recording medium, a drive device that drives the data recording medium so that data can be recorded on the data recording medium, a recording device that records the data on the driven data recording medium, and a control device that controls the drive device and the recording device in such a manner that the data related to the first data item set by the setting device is recorded in a first recording area of the data recording medium and the data related to a second data item set by the setting device is recorded in a second recording area of the data recording medium for each photographic frame.

25 Claims, 12 Drawing Sheets

FIG. 1

DATA ITEM TO IMPRINT
ON THE LEADER PORTION

1. NO IMPRINTING
2. YEAR/MONTH/DAY
3. DAY/MONTH/YEAR
4. MONTH/DAY/YEAR
5. DAY/HOUR/MINUTE
6. SHUTTER SPEED, APERTURE VALUE
7. FRAME NUMBER
8. FIXED NUMERICAL VALUE
9. FILM NUMBER

FIG.3

DATA ITEM TO IMPRINT
IN EACH PHOTOGRAPHIC FRAME

1. NO IMPRINTING
2. YEAR/MONTH/DAY
3. DAY/MONTH/YEAR
4. MONTH/DAY/YEAR
5. DAY/HOUR/MINUTE
6. SHUTTER SPEED, APERTURE VALUE
7. FRAME NUMBER
8. FIXED NUMERICAL VALUE
9. FILM NUMBER

| BIT 7 | 6 | 5 | 4 | 3 | 2 | 1 | 0 | |
|---|---|---|---|---|---|---|---|---|
| 0 | 0 | 0 | 0 | X | X | X | X | : NO IMPRINT |
| 1 | 0 | 0 | 0 | 0 | 0 | 0 | 1 | : YEAR/MONTH/DAY |
| 1 | 0 | 0 | 0 | 0 | 0 | 1 | 0 | : DAY/MONTH/YEAR |
| 1 | 0 | 0 | 0 | 0 | 1 | 0 | 1 | : MONTH/DAY/YEAR |
| 1 | 0 | 0 | 0 | 0 | 1 | 0 | 0 | : DAY/HOUR/MINUTE |
| 1 | 0 | 0 | 0 | 0 | 1 | 1 | 1 | : SHUTTER SPEED, APERTURE VALUE |
| 1 | 0 | 0 | 0 | 0 | 1 | 1 | 0 | : FRAME NUMBER |
| 1 | 0 | 0 | 0 | 1 | 0 | 0 | 0 | : FIXED NUMERICAL VALUE |
| 1 | 0 | 0 | 0 | 0 | 0 | 0 | 0 | : FILM NUMBER |

DATA RECORDING APPARATUS

BACKGROUND OF THE INVENTION

1. Field of the Invention

The present invention relates to a data recording apparatus that is capable of recording photographic data on a data recording medium like a film.

2. Description of the Related Art

In the known art, there are cameras that are capable of imprinting data, including the film number and the like, at a location ahead of the first photographic frame of a film (hereafter referred to as film leader portion) as well as imprinting data such as the photographing date within the exposure area of each photographic frame of the film for photography. With this type of camera, when new film is loaded, the film is wound up to the point where a specific area on the film leader portion faces opposite the aperture and the film stops at that position. Then, in this state, data are imprinted by an imprinting apparatus. After that, the film is wound up again until the photographic frame at the front end of the film faces opposite the aperture and each time a photograph is taken, data are imprinted within the exposure area of each photographic frame. Normally, the data that are imprinted on the film leader portion represent information that is inherent to the film, including the film number mentioned above, while the data that are imprinted on each photographic frame represent information that is inherent to that particular frame, including the photographing date and the exposure value.

However, the camera in the prior art is structured in such a manner that switching between the data item for imprinting on the film leader portion and the data item for imprinting on individual photographic frames is handled through manual operation of an operating member for switching. Because of this, if the photographer fails to perform the data switching operation with the operating member after the data inherent to the film are imprinted on the film leader portion and before data imprinting on individual photographic frames is started, the data that are inherent to the film and which are meaningless for individual photographic frames will, nevertheless, be imprinted on the photographic frames.

SUMMARY OF THE INVENTION

An object of the present invention is to provide a data recording apparatus with which the recording of meaningless data on individual photographic frames of film is prevented.

In order to achieve the object described above, the data recording apparatus according to the present invention is provided with a setting device that separately sets first data item that relates to the photographic image recording medium and second data item that relates to photographic images of a plurality of frames to be recorded on the photographic image recording medium, a drive device that drives the data recording medium so that the data are recorded on the data recording medium, a recording device that records the data on the driven data recording medium, and a control device that controls the drive device and the recording device in such a manner that the data related to the first data item set by the setting device is recorded in a first recording area of the data recording medium, and the data related to the second data item set by the setting device is recorded in the second recording area of the data recording medium for each photographic frame.

According to the present invention, the first data item related to the photographic image recording medium and the second data item related to photographic images of a plurality of frames to be recorded on the photographic image recording medium are set separately and the data related to the first and the second data items are recorded in the first and second recording areas respectively. As a result, it is not necessary to switch data items in correspondence with the different data recording areas through the operation of an operating member, and an improvement in operability is achieved. At the same time, the recording of meaningless data on individual photographic frames of film is prevented.

DETAILED DESCRIPTION OF THE PREFERRED EMBODIMENTS

An embodiment according to the present invention is explained in reference to FIGS. 1–10.

Figure 1:
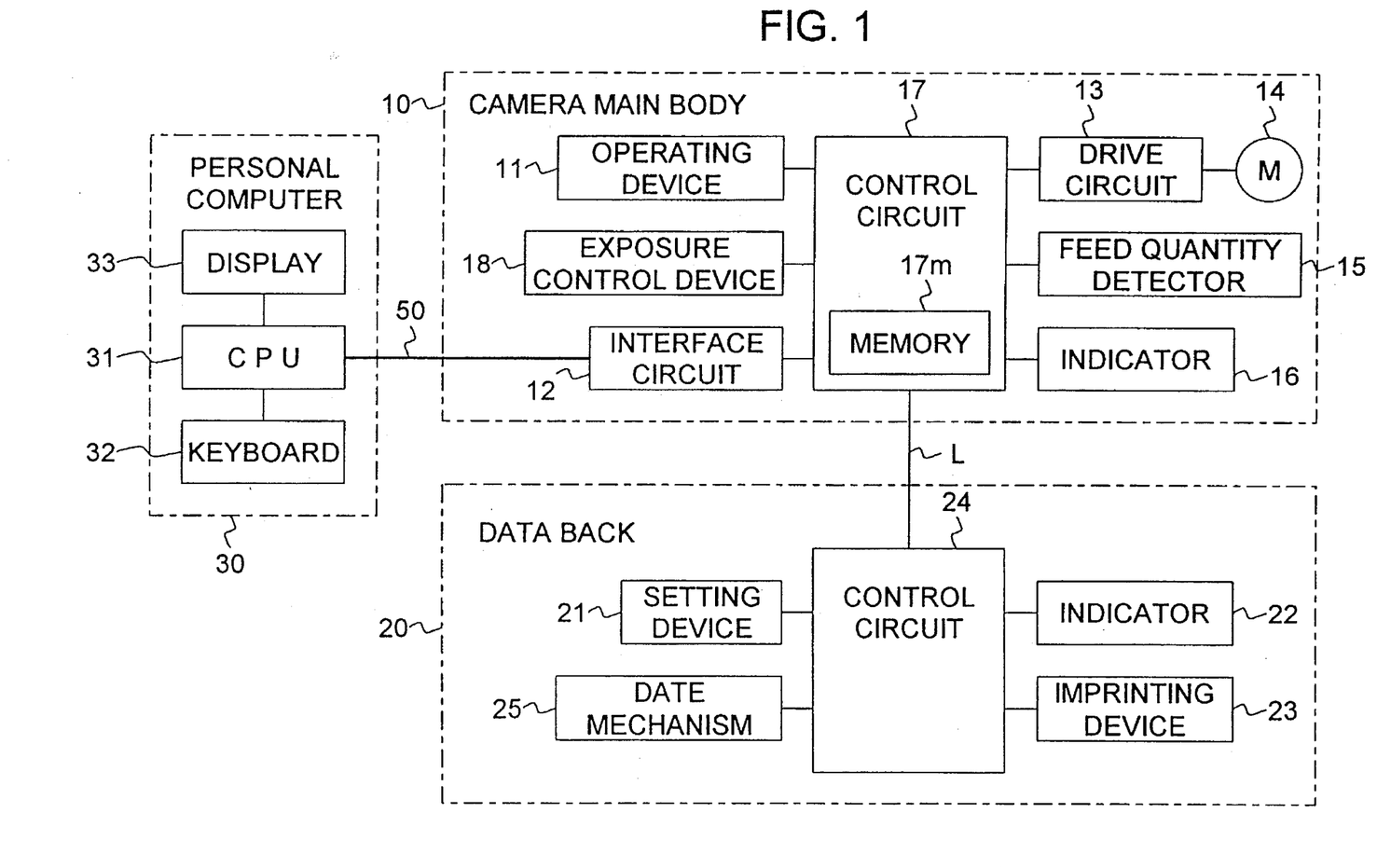
FIG. 1 is a block diagram showing the control system of a camera that is provided with a data recording apparatus in an embodiment according to the present invention.

FIG. 1 is a block diagram showing the structure of the control system of a camera that is internally provided with a data recording apparatus in an embodiment according to the present invention. A control circuit 17 that consists of a microcomputer and peripheral devices, such as a non-volatile memory 17m, is provided inside the camera main body 10. An operating device 11, which includes various types of operating members such as a release button, an interface circuit 12 for performing communication with an external device, such as a personal computer, a drive circuit 13 for a film feed motor 14, a feed quantity detector 15 that detects the quantity of film feed, an indicator 16 that displays various types of information including photographing conditions, and an exposure control circuit 18 that drives the aperture and the shutter (not shown) to perform photographing (exposure) are connected to the control circuit 17.

On the rear surface of the camera main body 10, a data back device 20 for imprinting various types of data on film is mounted. A control circuit 24, which consists of a microcomputer and peripheral devices is provided inside the data back device 20. A setting device 21, which sets data to be imprinted on the film (imprinting data), an indicator 22 that displays the imprinting data, an imprinting apparatus 23 that optically imprints the imprinting data on the film and a date mechanism 25 that counts the date and time are connected to the control circuit 24. As in the known art, the imprinting apparatus 23 is provided with a liquid crystal element which forms the imprinting data in a format appropriate for imprinting and a light source such as an LED for imprinting the imprinting data formed by the liquid crystal element on to the film. The control circuit 24 can communicate with the control circuit 17 in the camera main body 10 via a signal line L.

Figure 2:
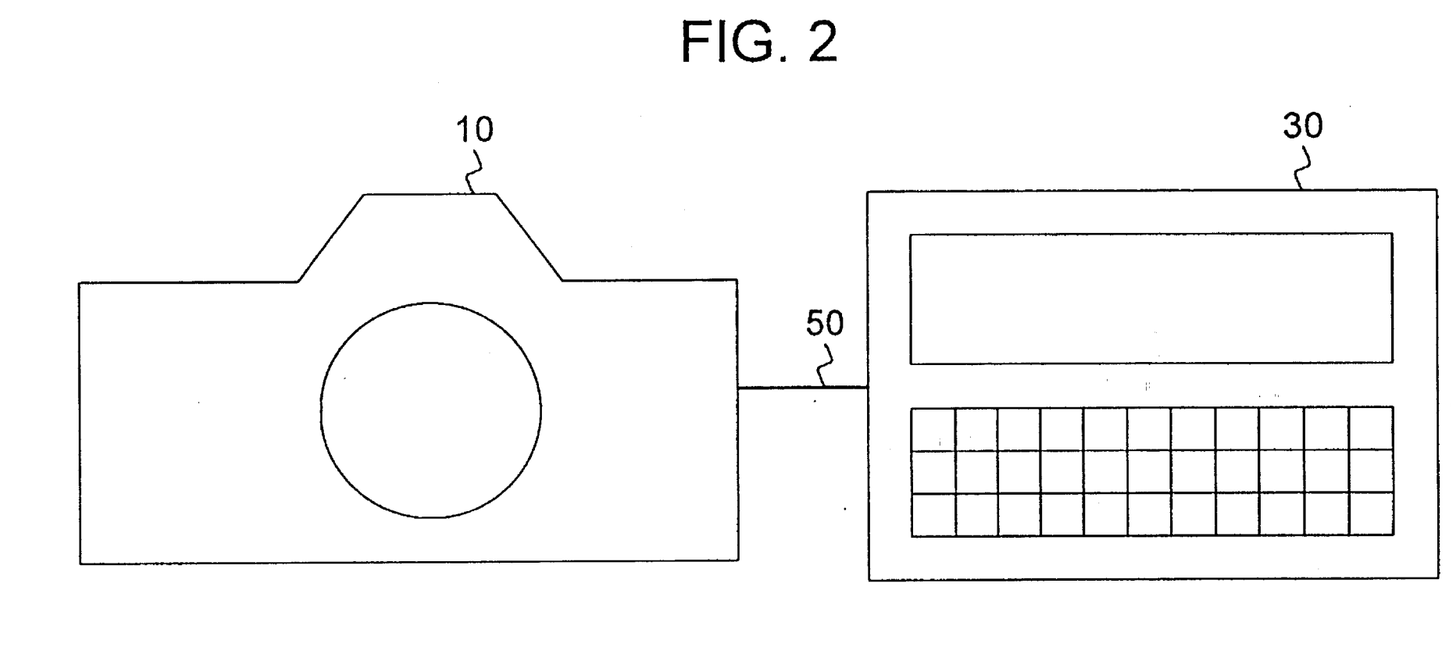
FIG. 2 illustrates a method for setting imprinting data item using a personal computer.

As shown in FIG. 2, the camera main body 10 can be connected to the personal computer 30 via a communicating cable 50 and the imprinting data set by the personal computer 30 are input to the camera main body 10 via the cable 50. The personal computer 30, as shown in FIG. 1, is provided with a CPU 31 and a keyboard 32 and a display device 33 are connected to the CPU 31.

Figure 3:
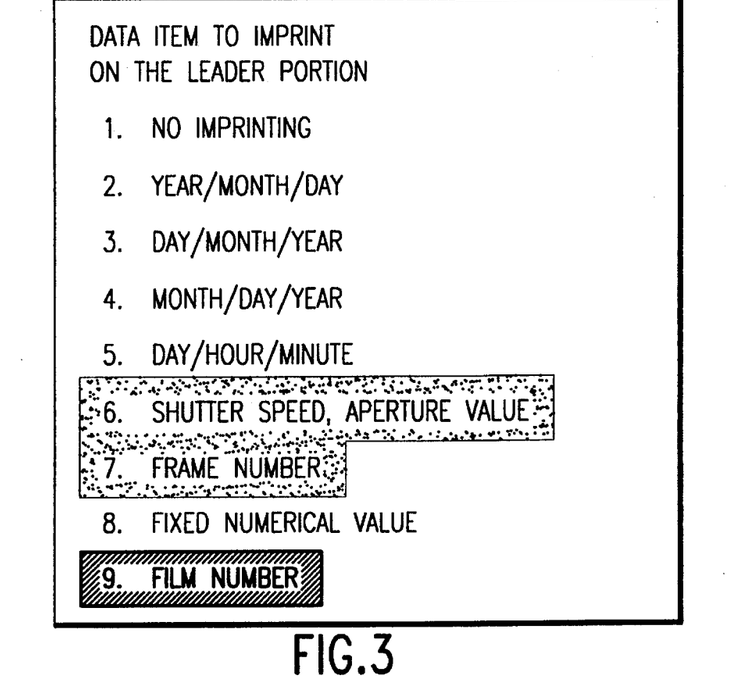
FIG. 3 is a screen display example for setting imprinting data item for the film leader portion.

FIG. 3 shows a screen display on the display device 33 of the personal computer 30. This display is for selecting the data item to be imprinted on the film leader portion, i.e., for selecting data item which is inherent to the film. When this screen is displayed, the data item that you wish to imprint on the film leader portion can be selected by moving the highlight cursor. The highlight cursor is moved through operation of the keyboard 32. The data item thus selected is then sent to the control circuit 17 via the interface circuit 12 of the camera main body 10 to be stored in the memory 17m. FIG. 3 shows an example in which the film number is set as an imprinting data item for the film leader portion. The film number is the equivalent of an id number for the film and is data that is inherent to the film.

Since the shutter speed, aperture value and the frame number are data that are inherent to individual photographic frames and not inherent to the film, it would be meaningless to imprint such data on the film leader portion. Thus, in the display shown in FIG. 3, these data items cannot be selected.

Figure 4:
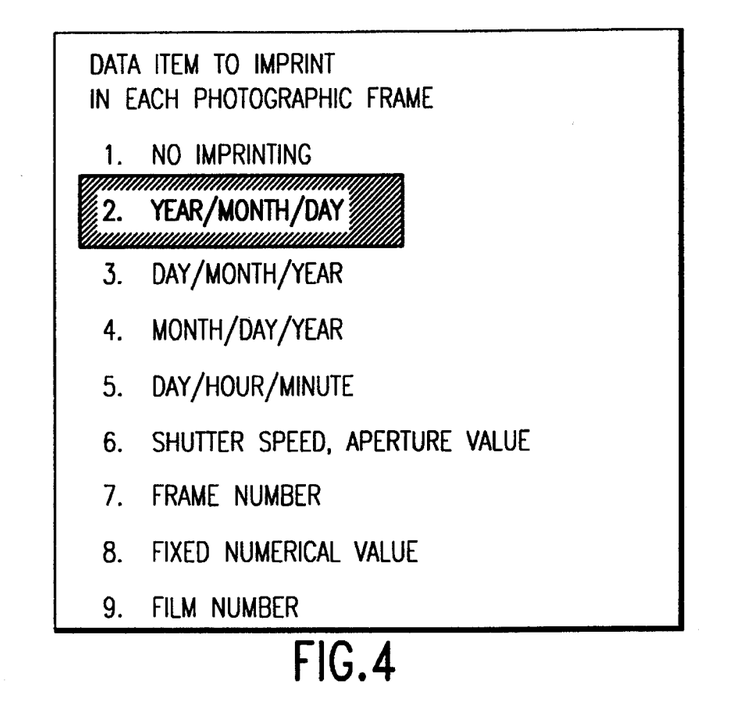
FIG. 4 is a screen display example for setting imprinting data item for individual photographic frames.

FIG. 4 show another screen display. This time, the display is used to select imprinting data item for individual photographic frames, i.e., data item inherent to individual frames. When this screen is displayed, the data item that you wish to imprint on the individual frames can be selected by moving the highlight cursor. The data item thus selected is then sent to the control circuit 17 via the interface circuit 12 of the camera main body 10 to be stored in the memory 17m. FIG. 4 shows an example in which the photographing date is selected as a data item to be imprinted on each frame.

Note that, although the film number is set as imprinting data for the film leader portion, it may also be set as imprinting data for the photographic frames, because by setting the film number as imprinting data for photographic frames, it is possible to determine which film was used for the image in a particular photographic frame that has been printed.

Figure 5:
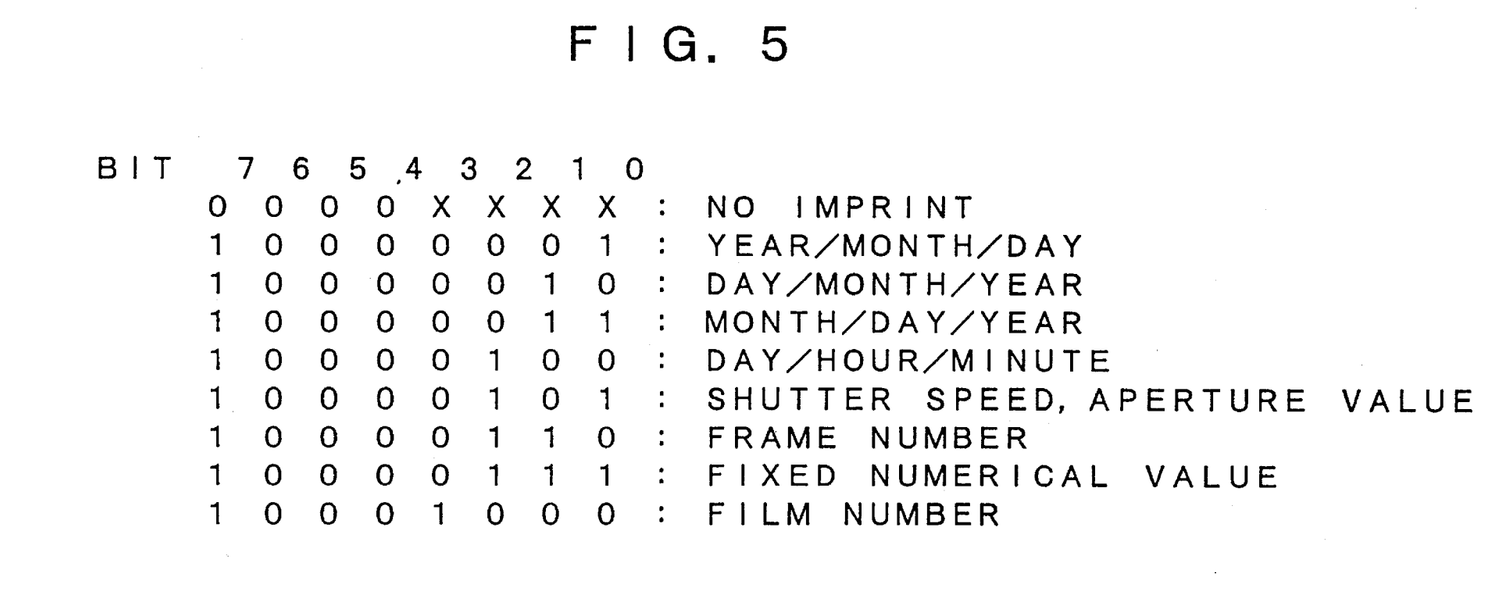
FIG. 5 shows a storage format of imprinting data item.

FIG. 5 shows a memory format for storing the data items in the memory 17m. The data items are formed into one byte-length data in which bits 0–3 indicate the contents of the data item and bit 7 indicates whether or not imprinting is possible. When bit 7 is set to "0", data imprinting is prohibited. The bits 7 of the data items not selected by the personal computer are set to be "0", therefore, the bit 7 of only one data item is set to be "1" in FIG. 5.

Figure 6:
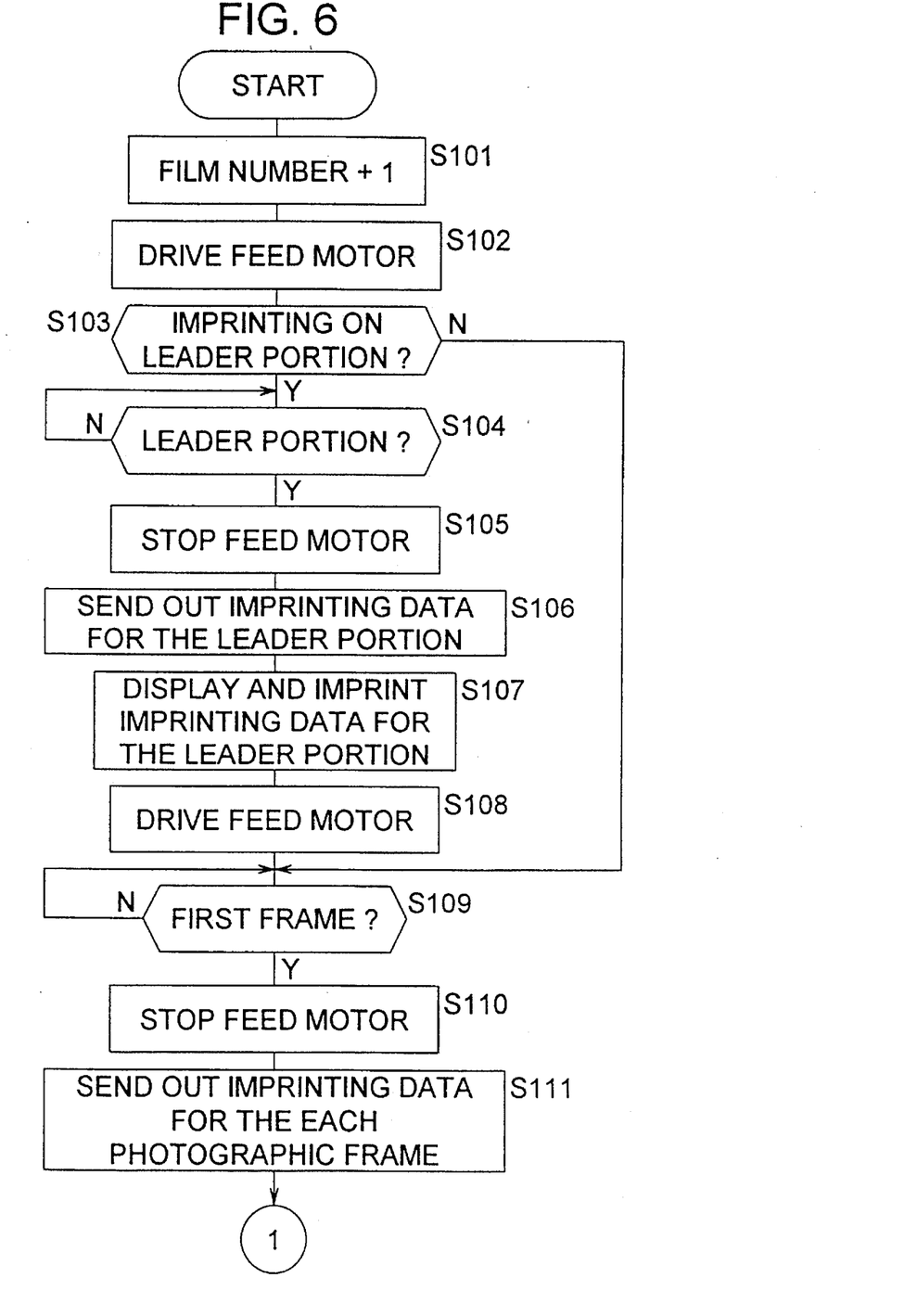
FIGS. 6 and 7 show a flow-chart that explains the data imprinting operation.
Figure 7:
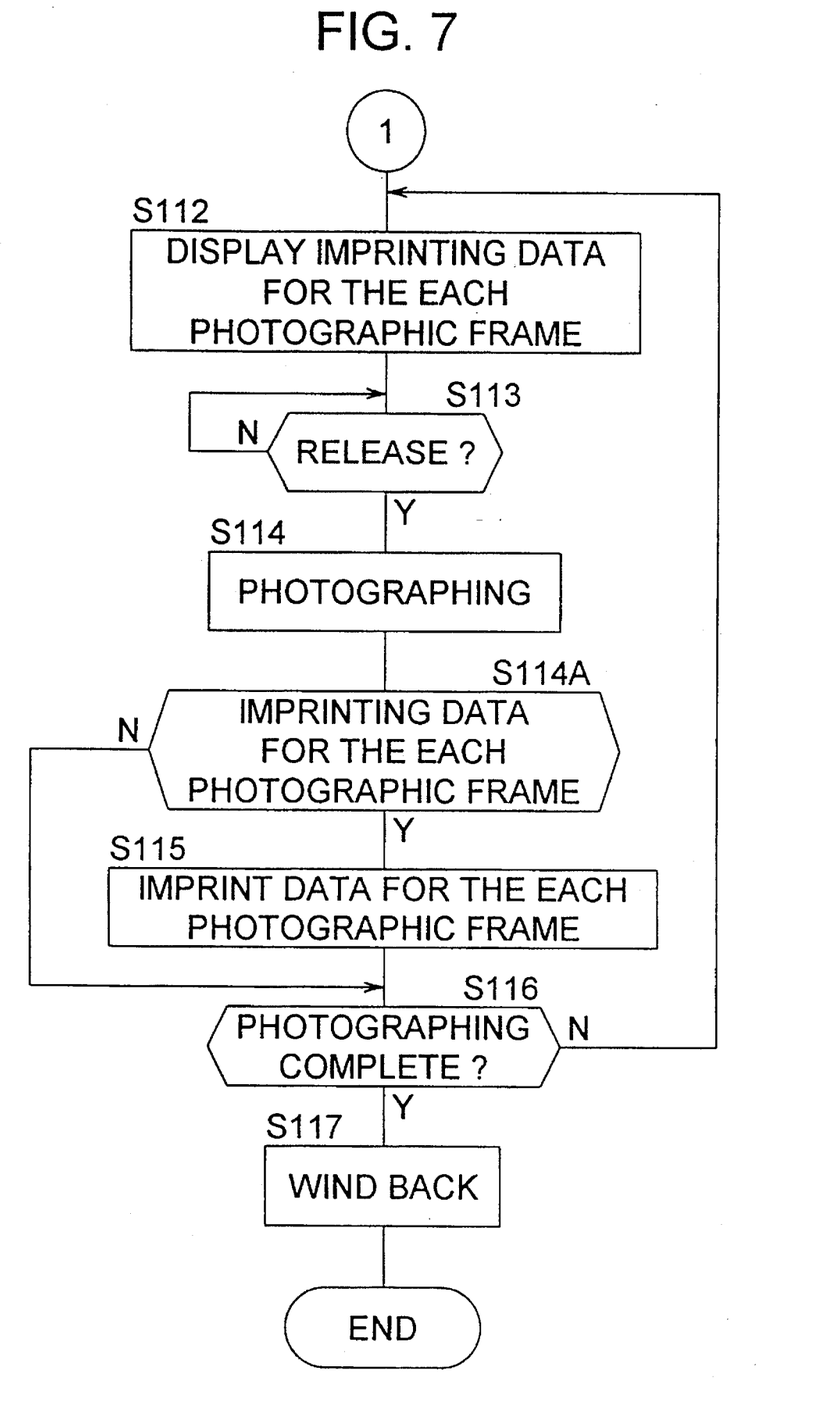

The procedure for data imprinting control performed by the control circuit 17 of the camera main body 10 and the control circuit 24 of the data back device 20 is explained in reference to the flow chart in FIGS. 6 and 7.

When film is loaded in the camera, and the release button in the operating device 11 is operated, this program is activated in the control circuit 17 of the camera main body 10. In step S101, the film number is incremented by one. In step S102, the initial feed of film is started by the feed motor 14 via the drive circuit 13. In step S103, imprinting data item for the film leader portion, which is stored in the memory 17m, are read out and, based upon the value of bit 7, a decision is made as to whether or not data imprinting in the leader portion is to be performed. If data are to be imprinted on the leader portion, the operation proceeds to step S104. Otherwise, the operation proceeds to step S109.

Figure 9:
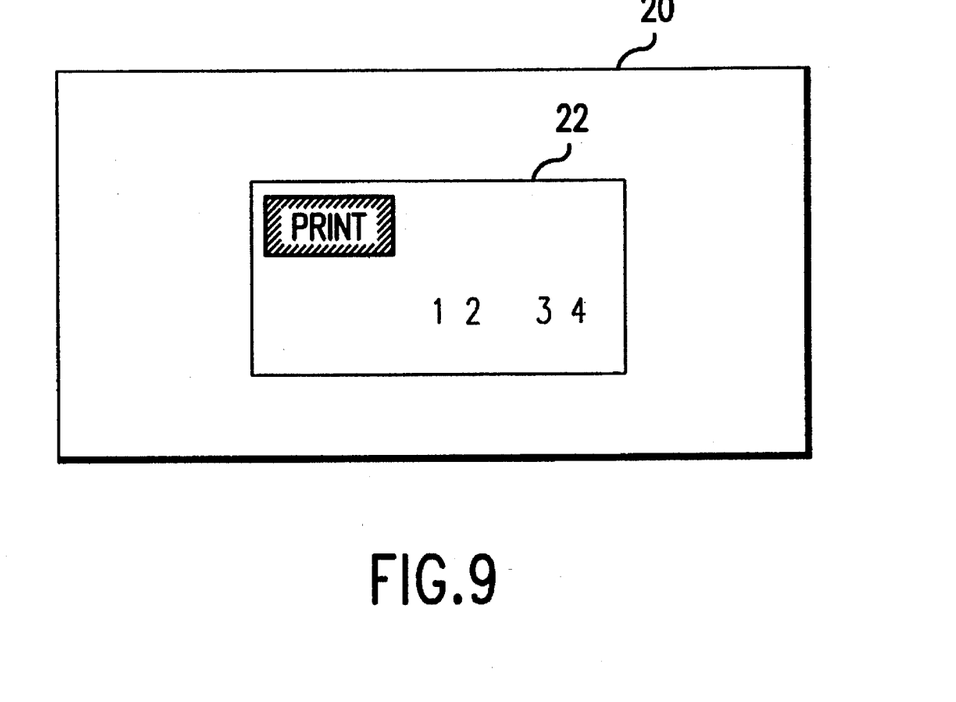
FIG. 9 shows an example of display of imprinting data on an indicator.
Figure 10:
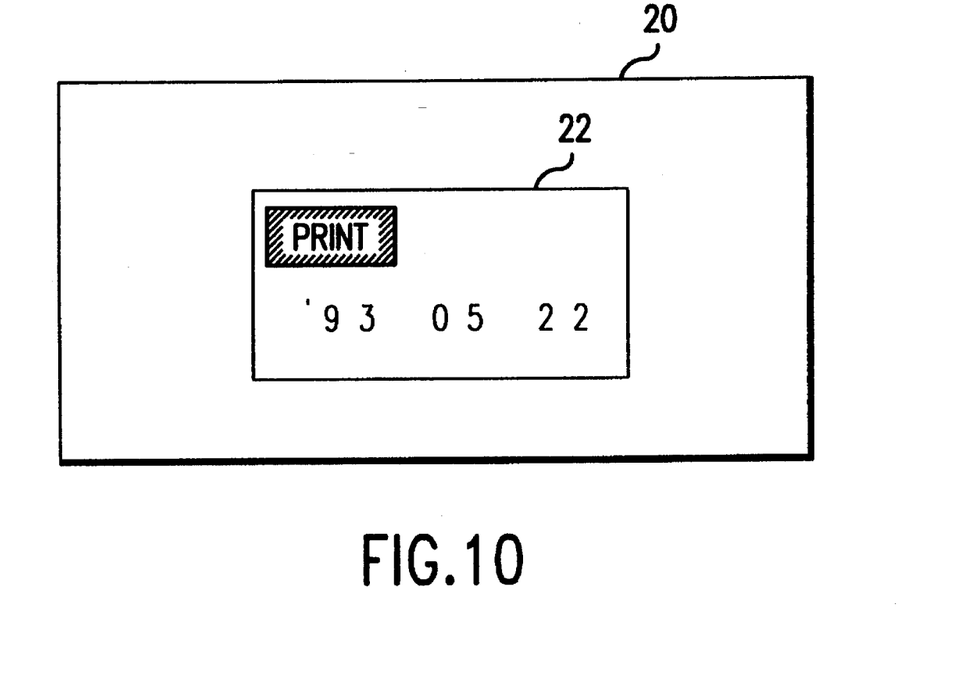
FIG. 10 shows another example of display of imprinting data on an indicator.

In step S104, the operation waits for the imprinting area in the film leader portion that is being fed to reach a specific imprinting position (the position that faces opposite the aperture of the camera) while monitoring the output from the feed quantity detector 15. Then the operation proceeds to step S105, in which the feed motor 14 is stopped via the drive circuit 13. In step S106, the imprinting data item and its details for the film leader portion are output to the control circuit 24 of the data back device 20. When the film number is set as imprinting data for the film leader portion, for instance, the item that indicates the film number and the current film number value that has been set in step S101 earlier, are sent out to the control circuit 24. In step S107, the imprinting data for the film leader portion, for example, the value of the film number, is displayed on the indicator 22 of the data back device 20, as shown in FIG. 9. Also, the relevant data are imprinted on the film leader portion by the imprinting apparatus 23.

When the data imprinting in the film leader portion is completed, the operation proceeds to step S108, in which film feed is started again by the motor 14 via the drive circuit 13. In step S109, the operation, monitored by the feed quantity detector 15, waits for the first frame (the photographic frame at the front end of the film) to face opposite the aperture. When the first frame faces opposite the aperture, the operation proceeds to step S110, in which the film feed is stopped. In step S111, the imprinting data item for each photographic frame and, if necessary, the contents of the data, are sent out to the control circuit 24 of the data-back device 20. For instance, when the photographing date is set as imprinting data for photographic frames, only the data item will be sent out to the data-back device 20 and the contents of the data are obtained from the date mechanism 25 of the data-back device 20. On the other hand, when the film number is set, for example, both the data item and the data contents are sent to the data-back device 20.

In step S112, shown in FIG. 7, the contents of the imprinting data for individual photographic frames, for example, the current date, is displayed on the indicator 22 of the data-back device 20. In step S113, the operation waits for the release button that constitutes the operating device 11 to be pressed. Then the operation proceeds to step S114, in which the photographing operation (exposure operation) is performed by the exposure control circuit 18. In step S114A, the imprinting data item for photographic frames that is stored in the memory 17m are read out and a decision is made as to whether or not data are to be imprinted within the exposure area of the relevant frame, depending on the value of bit 7. When imprinting is to be performed, the operation proceeds to step S115. Otherwise, the operation proceeds to step S116. In step S115, data regarding the relevant photographic frame are imprinted at a specific position within the exposure area of the particular photographic frame by the imprinting device 23. In step S116, a decision is made as to whether or not photographing has been completed for all the photographic frames of the film and if a negative decision is made, the operation returns to step S112. If, on the other hand, an affirmative decision is made, the operation proceeds to step S117, in which the film is wound back by the motor 14 via the drive circuit 13, and a cycle of sequential processing is completed.

Figure 8:
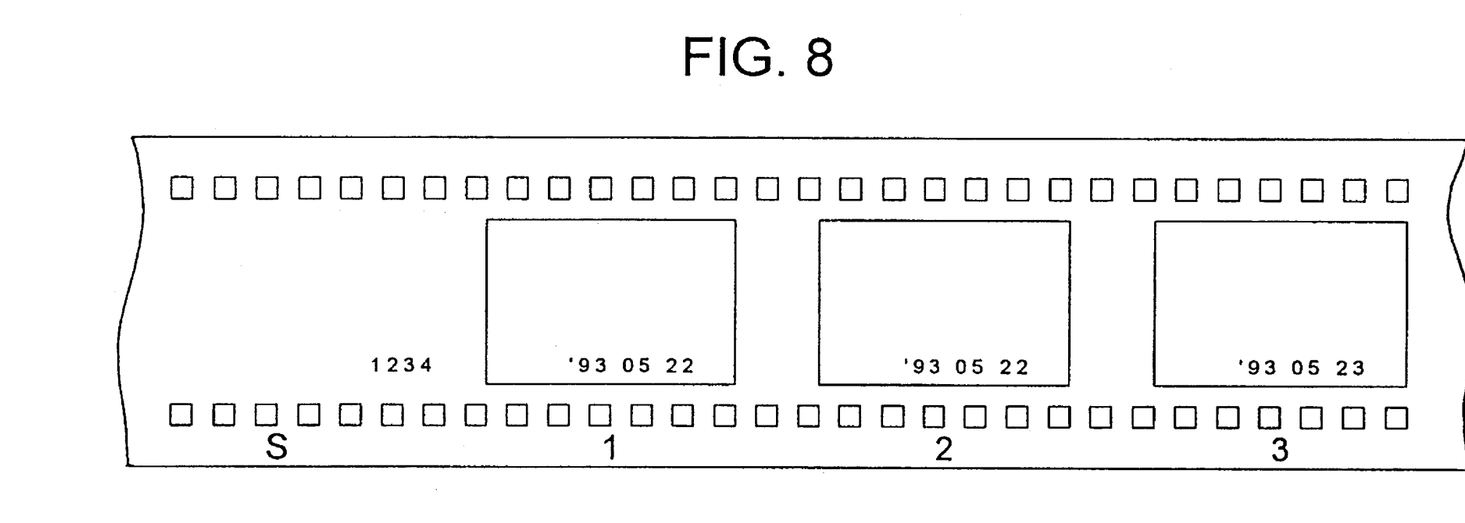
FIG. 8 shows film on which data are imprinted.

FIG. 8 shows an example of data imprinting. The film number "1234" is imprinted on the film leader portion and the photographing date is imprinted within the exposure area of each photographic frame.

As has been explained, in this embodiment, the data item related to the film and the data item related to the photographic images for a plurality of frames that are exposed in each film are set and stored in memory in advance. Then, when film is loaded in the camera, the data content corresponding to the data item related to the film that has been stored in memory is imprinted on the film leader portion. Then, the data content corresponding to the data item related to the photographic images that has been stored in memory is imprinted within the exposure area of each photographic frame. As a result, it is not necessary to switch data items with an operating member every time in correspondence with the imprinting position of data, thereby improving operability and, at the same time, preventing data that is inherent to the film from being inadvertently imprinted on individual photographic frames.

Figure 11:
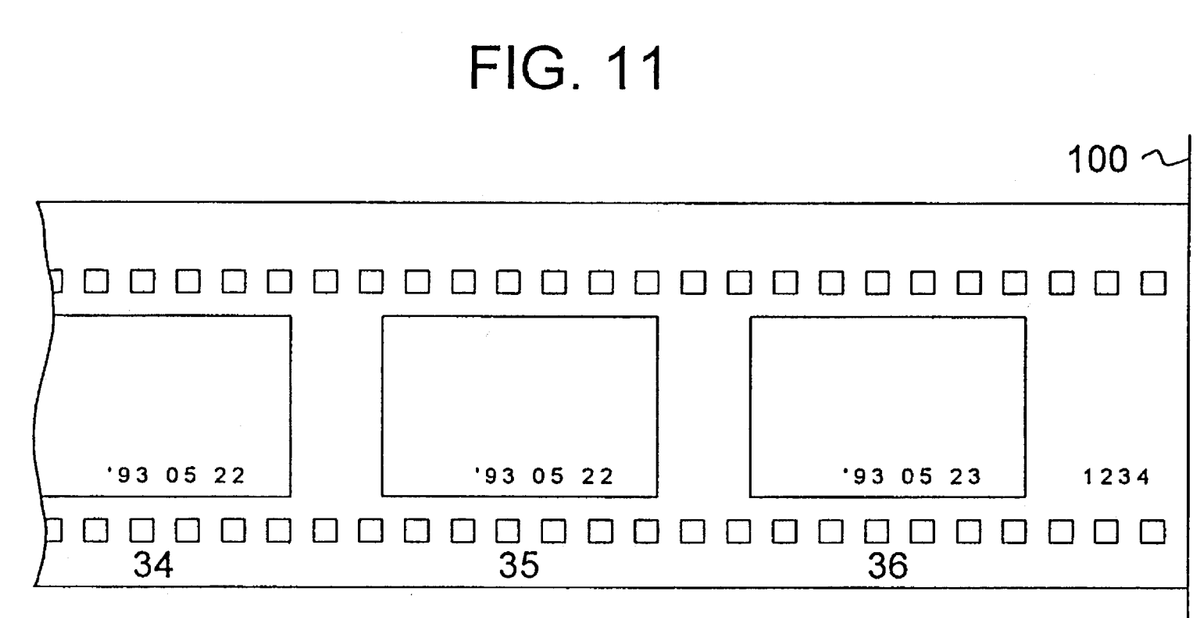
FIG. 11 shows an example of a variation of FIG. 8.

Note that it is acceptable for imprinting the data for each photographic frame, on an area between the exposure frames neighboring each other. Further, the embodiment described above is an example in which the information inherent to the film is imprinted on the film leader portion. However, as shown in FIG. 11, information that is inherent to the film may be imprinted on the area following the last photographic frame of the film. Reference number 100 indicates a film cartridge.

Furthermore, while the example above is a normal-type winding camera, in which film is wound up from the film cartridge into the camera, each time a photograph is taken, and the film is wound back to the cartridge when photographing of all the photographic frame is completed, the present invention can be applied in a pre-winding type camera, in which the entire film is wound up from a film cartridge prior to photographing, and the film is wound back to the cartridge each time a photograph is taken. In this case too, the information that is inherent to the film may be imprinted either on the film leader portion or on the portion following the last photographic frame of the film.

In the example described above, data are imprinted on the film optically. Another embodiment is explained below, in which data are magnetically recorded on film.

Figure 12:
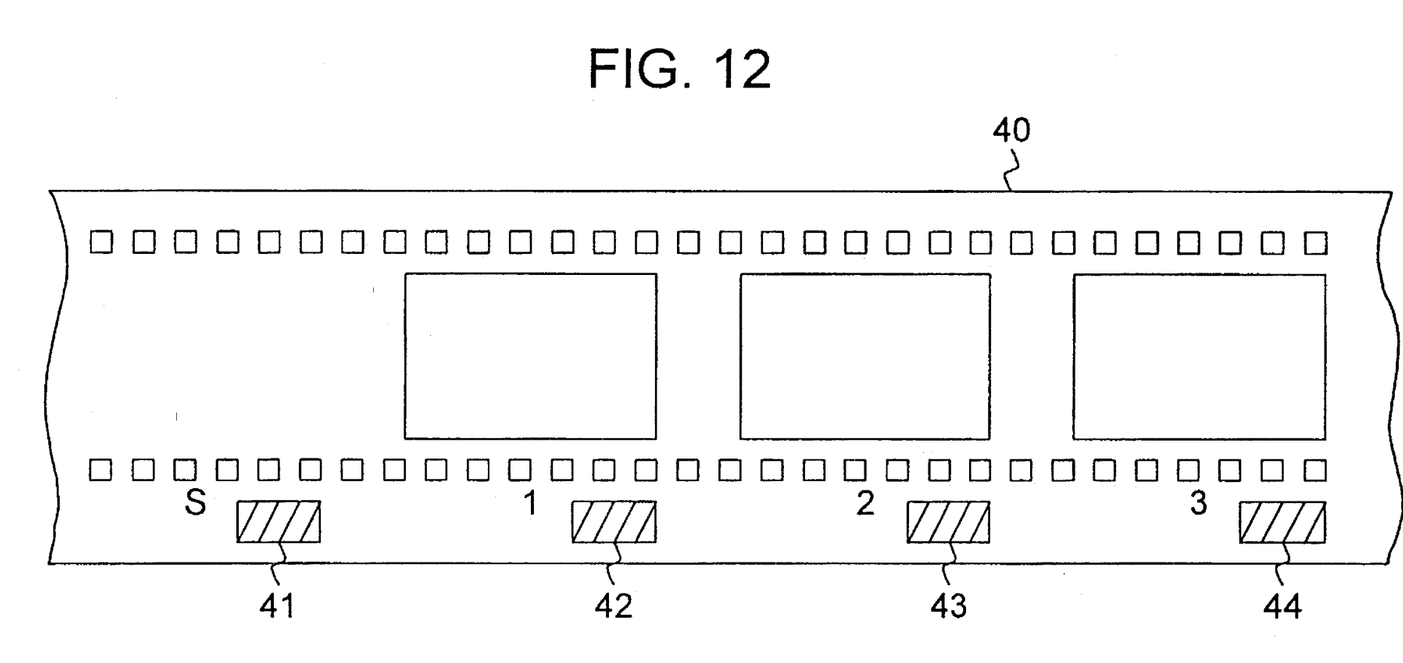
FIG. 12 shows another embodiment in which data are recorded magnetically on to film.
Figure 13:
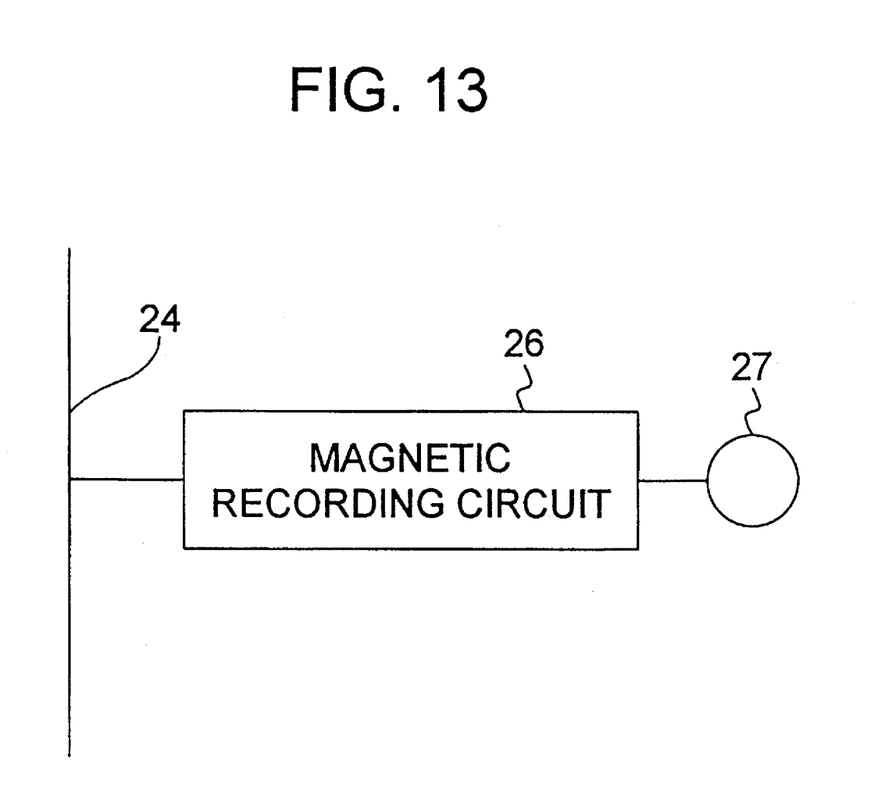
FIG. 13 is a block diagram showing a magnetic recording circuit and a magnetic head.

In this case, for example, a film 40, upon which magnetic tracks 41, 42, 43, 44 . . . are provided in the leader portion and in the vicinity of the exposure area of each photographic frame is used, as shown in FIG. 12. Also, as shown in FIG. 13, instead of the imprinting apparatus 23, a magnetic recording circuit 26 is connected to the control circuit 24 of the camera. The magnetic recording circuit 26 drives a magnetic head 27, which is secured at a specific position inside the camera main body 10 to record information on the magnetic tracks of the film.

Figure 14:
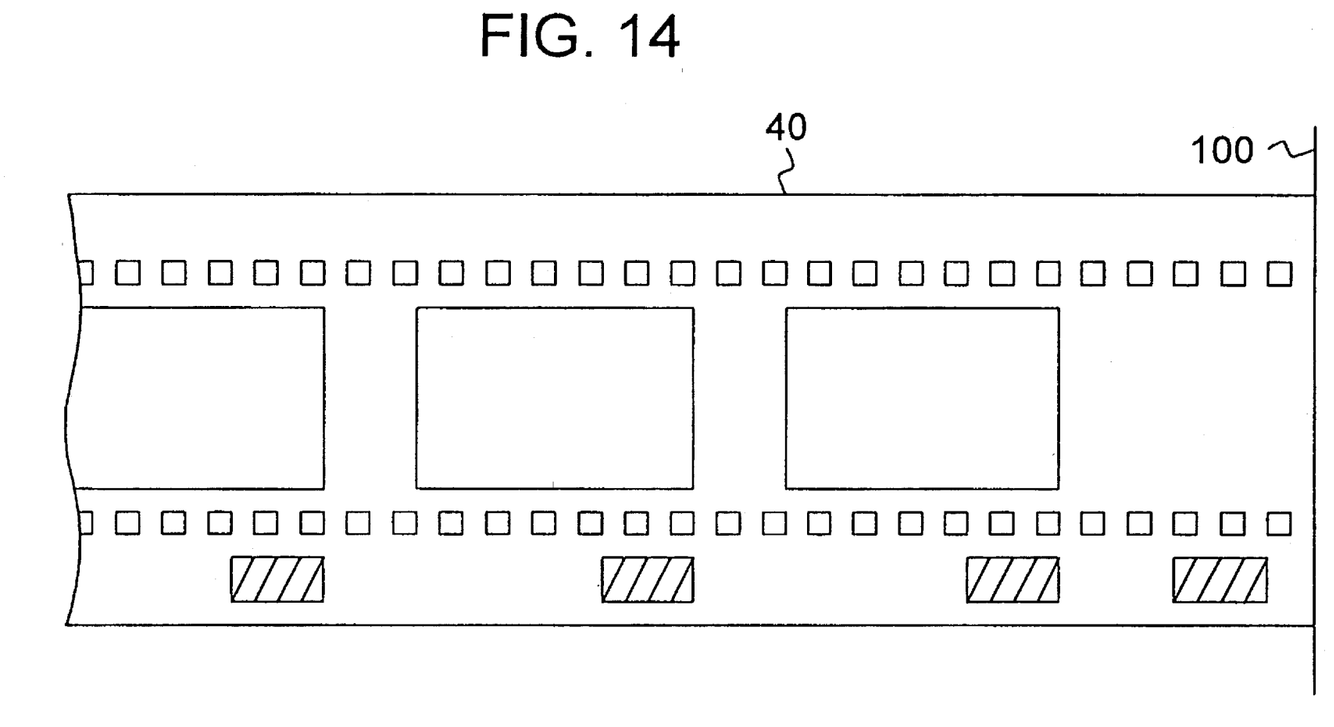
FIG. 14 shows an example of a variation of FIG. 12.

In this embodiment, the recording data item for the film leader portion and the recording data item for the photographic frames are set in advance by the personal computer 30. Then, when film is loaded, film feed starts and the recording data for the film leader portion are recorded on the magnetic track 41 when the magnetic track 41 passes the magnetic head 27. After that, when the film is wound up after a photograph is taken for each photographic frame, the recording data for individual photographic frames are recorded by the magnetic head 27 on each of the magnetic tracks 42, 43, 44 . . . . Note that in this case, too, the information that is inherent to the film may be recorded on the magnetic track that is provided following the last photographic frame of the film (refer to FIG. 14).

Although the two embodiments described above feature examples in which types of recording data items are set with a personal computer, an electronic PIM-type device may be used instead of a personal computer. Also, the data items may be displayed on the indicator 16 provided in the camera main body 10 and the data item may be set with the operation setting unit 11. In addition, the order in which the data inherent to the film and the data inherent to the photographic frames are recorded is not under any restriction and the latter may be recorded before the former.

Also, although explanation has been made in reference to a camera of the type that exposes film, the present invention can be applied to the so-called still video camera devices, which electronically record information related to photographic images on a recording medium such as a floppy disk. In that case, an area for recording data related to the floppy disk and an area for recording data related to the photographic images for a plurality of frames would be provided within the floppy disk. When recording data, the recording apparatus can be operated while rotating the floppy disk with a drive device.

In addition, while a system in which a camera is combined with other devices has been described so far, the data recording apparatus according to the present invention may be applied to a device that has no photographic function. In other words, the present invention can be applied to a device other than a camera, which simply performs data recording.

I claim:

1. A data recording apparatus, comprising:

a setting device that separately sets a first data item related to a photographic image recording medium and a second data item related to photographic images of a plurality of photographic frames to be recorded on said photographic image recording medium;

a drive device that drives a data recording medium so that data can be recorded on said data recording medium;

a recording device that records data on said data recording medium;

a control device coupled to the setting device that controls said drive device and said recording device to record said first data item only in a first recording area of said data recording medium and said second data item only in a second recording area of said data recording medium, the second recording area being used for each of the plurality of photographic frames; and a main body that includes said drive device and said control device.

2. A data recording apparatus according to claim 1, further comprising:

a memory device that stores said first and second data items set by said setting device, wherein said control device controls said drive device and said recording device to record said first data item stored in said memory device in said first recording area of said data recording medium and said second data item stored in said memory device in said second recording area of said data recording medium.

3. A data recording apparatus according to claim 1, wherein:

said first data item is one of a photographing start date, photographing start time and film number; and said second data item is one of a photographing date, photographing time, frame number, shutter speed, aperture value and film number.

4. A data recording apparatus according to claim 1, wherein:

said setting device includes an indicator device that displays a plurality of data items on a display screen; and a selecting device that selects one of said plurality of data items displayed on said display screen in response to an operation of an operating member, the selecting device setting said selected data item as one of said first data item and as said second data item.

5. A data recording apparatus according to claim 4, further comprising:

a memory device that stores said first and second data items selected and set by said selecting device, wherein said control device controls said drive device and said recording device to record said first data item stored in said memory device in said first recording area of said data recording medium, and to record said second data item stored in said memory device in said second recording area of said data recording medium.

6. A data recording apparatus according to claim 5, wherein said main body is a camera main body that includes said drive device, said memory device, and said control device, said setting device being provided in a device separate from said camera main body.

7. A data recording apparatus according to claim 6, wherein said device is connected to said camera main body via a cable.

8. A data recording apparatus according to claim 1, wherein said control device controls said drive device and said recording device to record said second data item in said second recording area in synchronization with photographing, said second recording area being on each of the plurality of photographic frames.

9. A data recording apparatus according to claim 1, wherein said photographic image recording medium is a film with the plurality of photographic frames.

10. A data recording apparatus according to claim 9, wherein said data recording medium is said film.

11. A data recording apparatus according to claim 10, wherein said first recording area is an area outside an exposure area of each of the plurality of photographic frames of said film and said second recording area of said data recording medium is one of an area inside said exposure area of each of said plurality of photographic frames of said film and an area between adjacent exposure areas.

12. A data recording apparatus according to claim 10, wherein:

said drive device is a feed device that feeds said film;

said recording device is an imprinting device that optically imprints data on said film; and said control device is an imprinting control device that controls said feed device and said imprinting device to imprint said first data item on said first recording area of said film and thereafter to imprint said second data item on sub-areas of said second recording area of said film.

13. A data recording apparatus according to claim 12, wherein said first recording area is an area positioned at a front end of said film before a photographic frame and each of said sub-areas of said second recording area is one of an area inside an exposure area of each of the plurality of photographic frames of said film and an area between adjacent exposure areas.

14. A data recording apparatus according to claim 12, wherein said first recording area is an area positioned at a rear end of said film following a photographic frame and each of said sub-areas of said second recording area is one of an area inside an exposure area of each of the plurality of photographic frames of said film and an area between adjacent exposure areas.

15. A data recording apparatus according to claim 12, wherein said main body is a camera main body, and said imprinting device is provided inside a data-back device mounted to said camera main body.

16. A data recording apparatus according to claim 10, wherein:

said drive device is a feed device that feeds said film;

said recording device is a magnetic recording device that performs magnetic recording on said film as said film is fed; and said control device is a magnetic recording control device that controls said feed device and said magnetic recording device to record said first data item on said first recording area of said film and thereafter to record said second data item on sub-areas of said second recording area of said film.

17. A data recording apparatus according to claim 16, wherein said first recording area is an area positioned at a front end of said film ahead of a photographic frame and each of said sub-areas of said second recording area is near exposure areas of each of the plurality of photographic frames of said film.

18. A data recording apparatus according to claim 16, wherein said first recording area is an area positioned at a rear end of said film following a photographic frame and each of said sub-areas of said second recording area is near exposure areas of each of the plurality of photographic frames of said film.

19. A photographing and data recording system, comprising:

an exposure device which exposes a film;

a setting device that sets a first data item that is related to said film and a second data item that is related to a plurality of photographic frames of photographic images to be recorded on said film;

a feed device that feeds said film;

a recording device that records data on said film;

a control device that controls said feed device, said recording device and said exposure device so that an initial feed of said film starts after both of said first and said second data items are set by said setting device, said first data item set by said setting device being recorded only in a first recording area of said film when said film reaches a specific position, and said second data item set by said setting device being recorded only in a second recording area of said film in response to an exposure operation for each of the plurality of said photographic frames performed by said exposure device after said first data item is recorded, said second recording area being used for each of the plurality of photographic frames; and a main body that includes said exposure device, said feed device and said control device.

20. A photographing and data recording system according to claim 19, further comprising:

a memory device that stores in memory said first and second data items set by said setting device, wherein said control device controls said recording device and said feed device to record said first and second data items stored in said memory device in said first and second recording areas of said film, respectively.

21. A photographing and data recording system according to claim 19, wherein:

said recording device is an imprinting device that optically imprints data on said film; and said control device controls said imprinting device and said feed device to imprint said first data item on said first recording area outside an exposure area of said plurality of photographic frames of said film and said second data item on sub-areas of said second recording area, said second recording area being one of an area inside said exposure area of each of said plurality of photographic frames of said film and an area between adjacent exposure areas.

22. A photographing and data recording system according to claim 19, wherein:

said recording device is a magnetic recording device that magnetically records data on said film; and said control device controls said magnetic recording device to record said first data item in a first magnetic recording area, said first magnetic recording area being one of an area positioned at a front end of said film ahead of a first photographic frame and an area positioned at a rear end of said film following a second photographic frame and to record said second data item in sub-areas of a second magnetic recording area near an exposure area of each of said plurality of photographic frames of said film.

23. A photographing and data recording system according to claim 19, wherein:

said first data item is one of a photographing start date, photographing start time and film number; and said second data item is one of a photographing date, photographing time, frame number, shutter speed, aperture value and film number.

24. A photographing and data recording system according to claim 19, wherein:

said setting device includes an indicator device that displays a plurality of data items on a display screen; and a selecting device that selects one of said plurality of data items displayed on said display screen in response to an operation of an operating member, the selecting device setting said selected data item as one of said first data item and said second data item.

25. A data recording apparatus, comprising:

setting means for separately setting a first data item that is related to a photographic image recording medium and a second data item that is related to photographic images of a plurality of photographic frames to be recorded on said photographic image recording medium;

recording means for recording data on said photographic image recording medium;

a control means for controlling said recording means to record said first data item set by said setting means only in a first recording area of a data recording medium and said second data item set by said setting means only in a second recording area of said data recording medium, said second recording area being used for each of a plurality of photographic frames; and a main body that includes said control means.

* * * * *